United States Patent
Obuchi et al.

(10) Patent No.: US 8,574,507 B2
(45) Date of Patent: Nov. 5, 2013

(54) HEAT EXCHANGER-INTEGRATED REACTION DEVICE HAVING SUPPLYING AND RETURN DUCTS FOR REACTION SECTION

(75) Inventors: Akira Obuchi, Ibaraki (JP); Junko Uchisawa, Ibaraki (JP); Tetsuya Namba, Ibaraki (JP); Akihiko Ooi, Ibaraki (JP); Norio Iijima, Ibaraki (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 3 days.

(21) Appl. No.: 13/259,790

(22) PCT Filed: Mar. 26, 2010

(86) PCT No.: PCT/JP2010/055322
§ 371 (c)(1),
(2), (4) Date: Sep. 23, 2011

(87) PCT Pub. No.: WO2010/110410
PCT Pub. Date: Sep. 30, 2010

(65) Prior Publication Data
US 2012/0031599 A1 Feb. 9, 2012

(30) Foreign Application Priority Data
Mar. 27, 2009 (JP) ................................ 2009-078700

(51) Int. Cl.
*B01J 19/00* (2006.01)
*F28F 3/00* (2006.01)
*F28F 3/08* (2006.01)

(52) U.S. Cl.
USPC ............ 422/198; 422/129; 165/166; 165/167

(58) Field of Classification Search
USPC ................... 422/129, 198; 165/164–167, 172
See application file for complete search history.

(56) References Cited

U.S. PATENT DOCUMENTS

| 5,466,421 | A | 11/1995 | Deller et al. |
| 7,237,604 | B2 * | 7/2007 | Emrich et al. ............... 165/167 |
| 2006/0096282 | A1 | 5/2006 | Friedrich et al. |

FOREIGN PATENT DOCUMENTS

| JP | 55094628 A | * | 7/1980 |
| JP | 2000-189757 A | | 7/2000 |

(Continued)

OTHER PUBLICATIONS

Machine translation of JP 2008-157592 A, which is included in the IDS filed Sep. 23, 2011 and published Jul. 10, 2008.*

(Continued)

*Primary Examiner* — Walter D Griffin
*Assistant Examiner* — Natasha Young
(74) *Attorney, Agent, or Firm* — Westerman, Hattori, Daniels & Adrian, LLP (57) ABSTRACT

A compact heat exchanger-integrated reaction device, comprising a heat exchange section and a reaction section, capable of providing high heat recovery performance, with a small number of ducts of the reaction section formed for supplying and return paths without increasing the volume of the entire reaction device. With the heat exchanger-integrated reaction device equipped with ducts in the reaction section adjacent to the plate-stacking-type heat exchange section, collection ducts for allowing a plurality of regions having openings for discharging a fluid to be processed to be connected with at least one supplying duct of the reaction section, and distribution ducts for allowing at least one supplying duct of the reaction section to be connected with a plurality of regions having openings for receiving the fluid from the heat exchange section are provided between the heat exchange section and the duct of the reaction section.

2 Claims, 10 Drawing Sheets

(56) References Cited

FOREIGN PATENT DOCUMENTS

| | | |
|---|---|---|
| JP | 2004-028556 A | 1/2004 |
| JP | 2004-069293 A | 3/2004 |
| JP | 2008-157592 A | 7/2008 |
| WO | 2010-074154 A1 | 7/2010 |

OTHER PUBLICATIONS

English translation of JP55-094628A, which was previously submitted and published on Jul. 18, 1980.*

International Search Report of PCT/JP2010/055322, mailing date Jun. 8, 2010.

* cited by examiner

HEAT EXCHANGER-INTEGRATED REACTION DEVICE HAVING SUPPLYING AND RETURN DUCTS FOR REACTION SECTION

TECHNICAL FIELD

The present invention relates to a reaction device equipped with both self-heat-exchange function and reaction function, more specifically, a reaction device capable of reducing heating energy necessary for reactions, or increasing and stabilizing the temperature of a reaction section, thus allowing a desired reaction to progress highly efficiently, by recovering the heat generated in the reaction section with the heat exchanger and efficiently preheating a fluid before reaction.

BACKGROUND ART

To cause chemical reactions, to detoxify toxic components contained in a fluid by decomposition or oxidation, in particular, the fluid to be treated is heated to increase the speed of desired chemical reaction. Furthermore, in order to perform the heating efficiently, the heat recovered from treated high-temperature fluid is fed to low-temperature fluid that is to be treated to preheat the low-temperature fluid. This procedure has been put to practical use as relatively large equipment such as regenerative volatile organic compound WOO removing devices, for example. However, since a small device must be used to detoxify gases having the treatment flow of 10 $m^3$/min or lower, heat dissipation rate at device elements and piping connecting them becomes relatively large. In addition, since a heat exchanger that is compact but has high heat recovery performance and high heat resistance cannot be obtained, a highly energy-saving reaction device having high heat recovery performance has yet to be commercialized.

To solve the above technical problems, proposals have been made to increase heat recovery performance by improving the connecting structure between a heat exchanger and a reaction part. For example, Patent Literatures 1 and 2 disclose reaction devices in which one end of the opening of a shell and tube heat exchanging structure and that of a catalytic structure for causing reaction are directly connected.

Furthermore, Patent Literatures 3, 4 and 5 disclose reaction devices in which a catalyst for promoting heating reaction is directly placed within a plate-type heat exchange structure.

CITATION LIST

Patent Literature

Patent Literature 1: JP2004-28556A
Patent Literature 2: US Patent 5466421
Patent Literature 3: JP2000-189757A
Patent Literature 4: US Patent Application 2006/0096282 A1
Patent Literature 5: JP2008-157592A
Patent Literature 6: PCT/JP2009/071455

SUMMARY OF INVENTION

Technical Problem

In both Patent Literatures 1 and 2, although one end of the opening of the heat exchanging structure and that of the catalytic structure are directly connected to each other, the other end of the opening of each cannot be connected for structural reasons, and consequently, a connecting passage is provided in a form of a pipe, or as a gap between the housing and the catalytic structure, to connect them indirectly. As a result, to form the relevant part, the entire volume of the reaction device increases, and the degree of heat dissipation also increases, thus making it difficult to obtain good temperature-increase effect by heat recovery. In addition, with a small shell and tube heat exchanging structure, high heat recovery performance can rarely be obtained.

Meanwhile, in Patent Literatures 3, 4 and 5, higher heat recovery performance is expected because of the plate-type counter flow heat exchanging structure. However, since both cases place a heating means such as catalyst directly within the heat exchanging structure, catalytic reaction and heat-exchange function interfere with each other, thus increasing ununiformity in temperature in the region where the catalyst is placed. Consequently, the flow rate in regions where the temperature is relatively low increases, decreasing the efficiency of desired reaction, toxic component removal ratio, for example.

Patent Literature 4 discloses a structure where a plate-type counter flow heat exchanging structure and a reaction section are separated from each other (See FIG. 15 of the Literature). In this case, however, a relatively large passage connecting the opening of the heat exchanging structure and that of the catalytic structure is necessary, which may increase the heat loss due to heat dissipation as in the case of Patent Literatures 1 and 2.

Figure 1A:
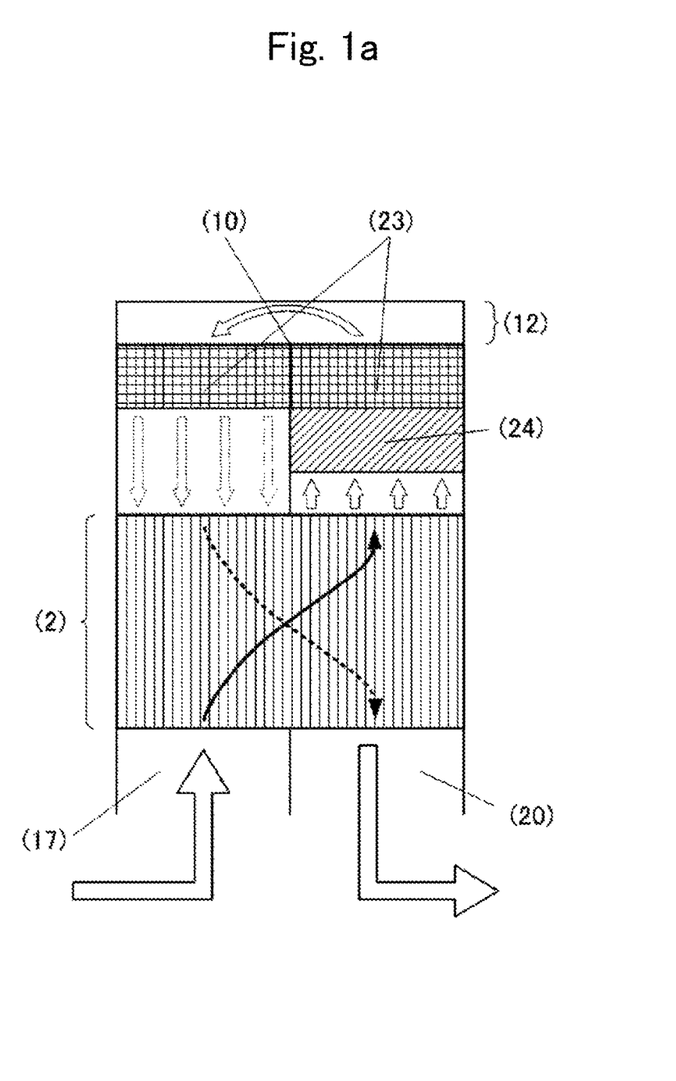
FIG. 1a is a cross-sectional view of a reaction device having one outlet and inlet each at each end of the heat exchange section according to the prior patent application.
Figure 1B:
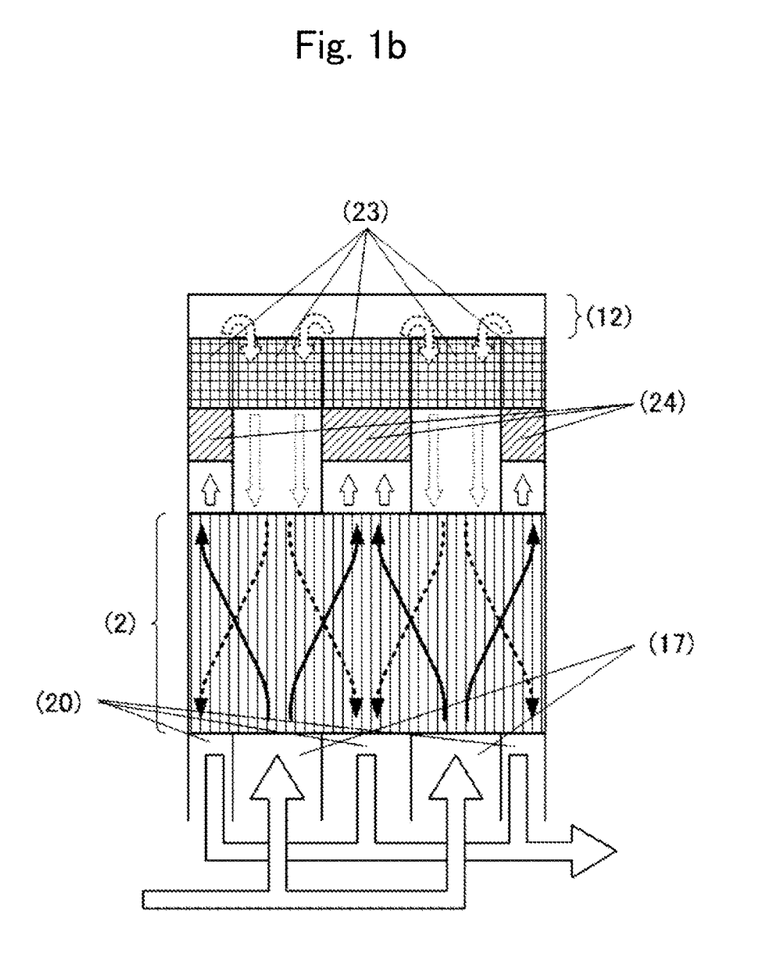
FIG. 1b is a cross-sectional view of a reaction device having a total of five outlets/inlets at each end of the heat exchange section according to the prior patent application.

In view of the above circumstances, the inventor et al have proposed a reaction device provided with inlets/outlets for a fluid to be treated on one side of a stacked plate-type heat exchanger, and a duct directly connected to the relevant side in the reaction section for housing reaction elements such as honeycomb catalyst, etc. (Patent Literature 6). FIG. 1 is a cross-sectional view of that embodiment. In the figure, 2 represents a stacked plate-type heat exchanging unit, 17 and 20 represent a part of space adjacent to the inlet and outlet of the fluid of the reaction device respectively, 23 and 24 represent reaction elements and a heating element placed within the duct of the reaction section respectively, and 12 represents space for connecting the outward and inward passages of the duct of the reaction section, and doorways to the outside of the device are provided on one side of the stacked plate-type heat exchanger 2. The arrows in the figure demonstrate the flow of the fluid to and from the stacked plate-type heat exchange unit 2.

Although this reactor solves the problem described above, additional problems to be solved were found.

To improve heat-exchanging performance of the reaction device shown in FIG. 1, it is necessary to make the supplying and return flows within the heat exchange section to be as close to a perfect counter flow as possible. To achieve that purpose, it is desirable that two or more inlets/outlets for a fluid be provided in the heat exchange section as shown in FIG. 1*b*, instead of one as shown in FIG. 1*a*. However, if two or more doorways are provided, the reaction section also requires two or more ducts to be directly connected to the fluid inlets/outlets of the heat exchange section. The reaction device shown in FIG. 1*a* has a relatively simple structure, with only one duct provided for each of the supplying and return paths. However, the supplying and return flows do not form a perfect counter flow, but form flows crossing approximately orthogonal to each other, which provides lower heat exchange performance. Meanwhile, with the device provided with three supplying ducts and two return ducts shown in FIG. 1*b*, the supplying and return flows are closer to a perfect counter flow, allowing higher heat exchange performance to be ensured. However, since there are five ducts in the reaction section, the temperature distribution within the reaction elements become ununiform, thus making the control of reactions difficult. In addition, since the flow is divided into multiple paths, it is necessary to install reaction elements and heating elements at multiple positions, which causes the device to be in a more complicated structure.

In view of the above situations, the present invention intends to provide a reaction device integrating a heat exchange section and a reaction section, wherein a small number of supplying and return ducts are formed for the reaction section without increasing the entire volume of the reaction device, and high heat recovery performance can be obtained.

Solution to Problem

As a result of an earnest study conducted to achieve an above objective, the inventor et al have improved the contents of the prior patent application regarding the heat exchanger-integrated self heat exchange structure having a plurality of planar flow paths, wherein the ducts in the reaction section are made to contact one side surface of the heat exchange section having openings for supplying and return flows, and heating elements and reaction elements are placed within the ducts. To improve the above structure, space was provided between the heat exchange section and the ducts of the reaction section, and by dividing the space into new collection ducts for introducing the supplying fluid discharged from two or more regions of the heat exchange section into the same or smaller number of, and at least one, supplying ducts of the reaction section, and new distribution ducts for distributing the returning fluid having passed a small number of, and at least one, return ducts of the reaction section into the same or higher number of regions of the heat exchange section provided with openings for distributing the returning fluid, the ducts in the reaction section were allowed to be integrated as required for each of the supplying and return paths.

The present invention for solving the problems described above has been achieved based on the above knowledge. Technical means supporting the invention are detailed below:

[1] A heat exchanger-integrated reaction device, comprising:

a heat exchange section; and a reaction section, the heat exchange section having an integrated stacking structure of a plurality of planar flow path layers divided by sheet partition walls, which serve as heat exchange surfaces, the plurality of planar flow paths extending in one direction with two types of flow paths, namely supplying and return paths of the same fluid, consecutively placed adjacent to each other, regions having outlets of the supplying paths and inlets of the return paths being provided on one side surface of the heat exchange section located at one end of the extending direction, the regions having the outlets of the supplying paths being provided with openings for discharging the fluid on the cross sections of every other stacked layers of the plurality of the planar flow paths, whereas the regions having the inlets of the return paths being provided with openings for receiving the fluid on the cross sections of every other stacked layers of the plurality of the planar flow paths not provided with the aforementioned openings, the reaction section in which reaction elements and/or heating elements are placed comprising at least one supplying duct and at least one return duct, and the supplying ducts and the return ducts being made to be connected with each other with space provided facing opposite to the heat exchange section, characterized in that at least one of the regions where the outlets of the supplying paths exist, or where the inlets of the return paths exist, is provided, at two or more positions, space is provided between the heat exchange section and the reaction section, the space being divided into at least one collection duct for collecting the flows of the fluid from the regions having the openings for discharging the fluid into the same or smaller number of supplying ducts of the reaction section and at least one distribution duct for distributing the flows of the fluid from the return duct of the reaction section into the same or larger number of regions having the openings for receiving the fluid, and that openings for allowing all the collection ducts to be connected with the supplying ducts of the reaction section are provided along with openings for allowing all the distribution ducts to be connected with the return ducts of the reaction section.

[2] The heat exchanger-integrated reaction device as set forth in [1], characterized in that one side surface of the heat exchange section has a plurality of valleys extending in one direction, the plurality of valleys having either the openings of the supplying paths or the openings of the return paths only, and that each concave space serves as a duct for collecting each flow of the supplying and return paths or a distribution duct, or a part thereof.

Advantageous Effects of Invention

According to the present invention, a desired reaction speed can be obtained by preheating a fluid to be reacted thoroughly, or the temperature of the reaction section can be stabilized to control the selectivity of reaction highly accurately, thus improving the performance of the reaction device dramatically. In addition, heating energy necessary for reaction can be saved. Furthermore, even if the outlet of the supplying path of the heat exchange section is divided into many regions to enhance heat recovery performance, the quantity of reaction element such as honeycomb catalyst can be reduced to one or two if the ducts of the reaction section are integrated into one for each of the supplying and return paths, which minimizes the time and trouble of replacing degraded reaction elements. In addition, when heating the reaction elements and the fluid on the supplying/return paths within this device, that objective can be achieved by placing a heating element at only one position because the reaction section is in a consecutive flow path structure. Even when the ducts in the reaction section are not integrated into one for each of the supplying and return paths, the number of heating elements can be reduced by the number of ducts of the reaction section reduced, compared with the conventional art wherein integration is not performed at all. Consequently, the device remains simple. The present invention is ideal as a small and high-performance reaction device for removing toxic components in gas. In particular, it is suitable for purifying air containing VOC in low concentrations and low-temperature exhaust gas from automobiles.

BRIEF DESCRIPTION OF DRAWINGS

FIG. 3 is a perspective cross-sectional view of the reaction device shown in FIG. 2 viewed from direction a.

DESCRIPTION OF EMBODIMENTS

The embodiments of the reaction device of the present invention will hereinafter be described by referring to the drawings, but the present invention is not limited to these embodiments.

First Embodiment

Figure 2:
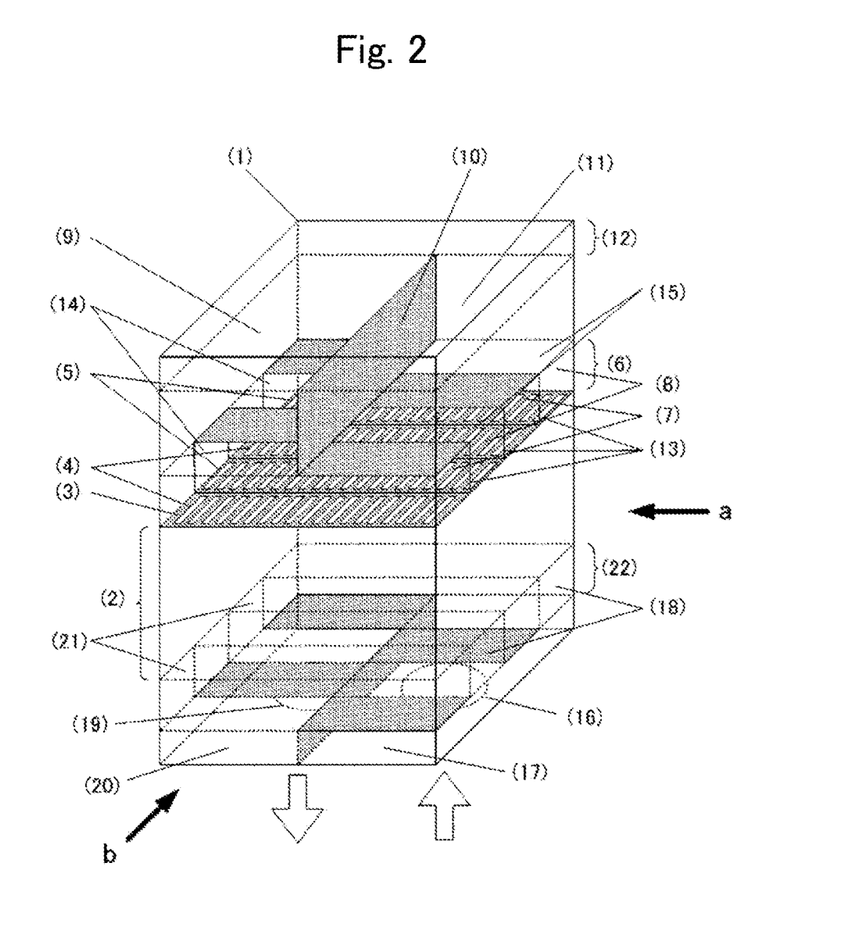
FIG. 2 is a cubic perspective view of an embodiment of the reaction device of the present invention. The space provided between the heat exchange section and the supplying/return ducts of the reaction section is divided to provide collection and distribution ducts.
Figure 3:
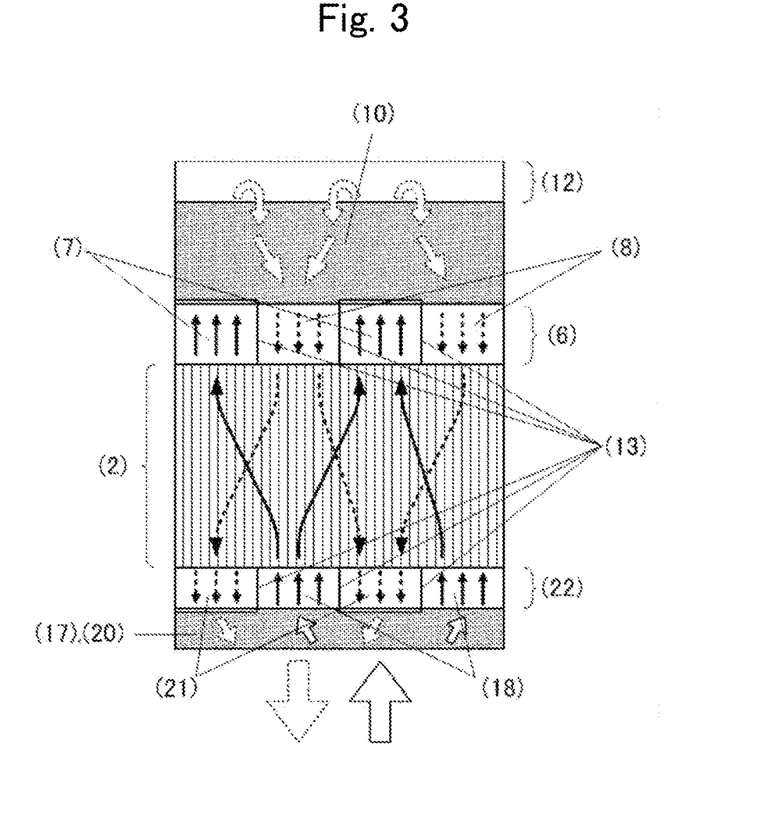
Figure 4:
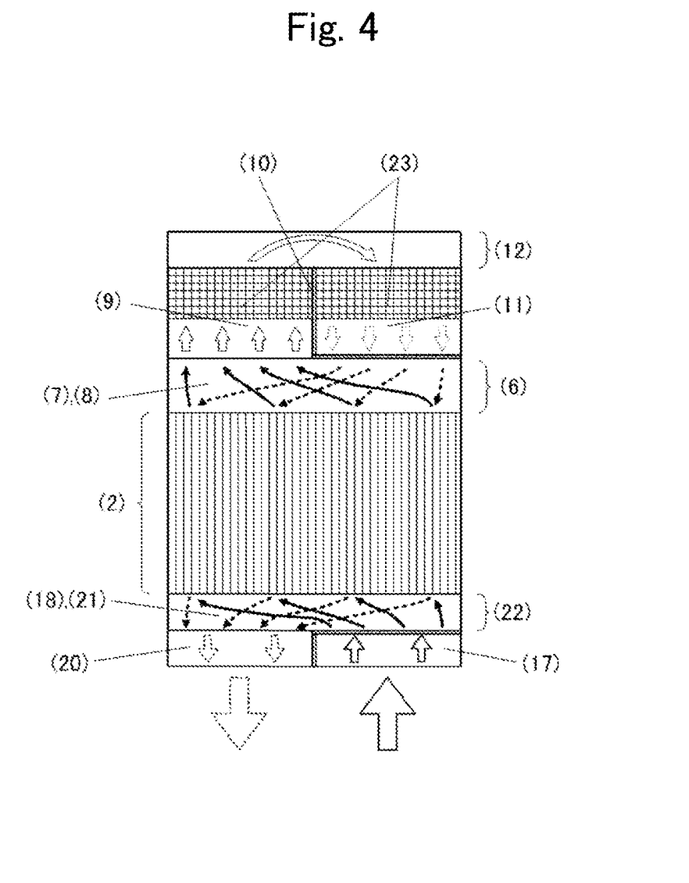
FIG. 4 is a perspective cross-sectional view of the reaction device shown in FIG. 2 viewed from direction b.

FIGS. 2 to 4 are perspective views illustrating the first embodiment of the reaction device of the present invention. Two regions where outlets for supplying paths exist, and also two regions where inlets for return paths exist, are provided. The space provided between the heat exchange section and the supplying/return ducts of the reaction section is divided to provide collection and distribution ducts. FIGS. 3 and 4 are perspective cross-sectional view of the device shown in FIG. 2 viewed from directions a and b respectively mainly showing the flow paths within the reaction device.

In the figures, 1 indicates the heat exchanger-integrated reaction device including: a heat exchange section 2; a reaction section (no sign) having a supply duct 9, and a return duct 11; a space 6 provided between the reaction section and the heat exchange section 2; and a space 12 for allowing the supply duct 9 in the reaction section to be connected with the return duct 11 of the reaction section Similar to the device shown in FIG. 1, reaction elements and heating elements are placed within the reaction section, but they are omitted in FIGS. 2 to 4.

The heat exchange section has an integrated stacking structure of a plurality of stacked planar flow path layers divided by sheet partition walls, which serve as heat exchange surfaces, with the supplying paths that share the fluid inlet port 16 and return paths that share the fluid outlet port 19 stacked alternately. These flow paths extend in one direction, and on one side surface 3 of the heat exchange section at one end of the extending direction, two regions 4 where the outlets of the supplying paths of the heat exchange section exist and two regions 5 where the inlets of the return paths of the heat exchange section exist are provided. The regions 4 are provided with a plurality of openings on the cross sections of the plurality of the stacked flow paths at every other stacked layers as the outlets of the supplying paths, whereas the regions 5 are provided with a plurality of openings on the cross sections of the plurality of the planar flow paths at every other stacked layers not provided with the afore-mentioned openings.

In FIG. 2, 6 represents the space adjacent to the side surface 3 of the heat exchange section, 7 represents ducts in the space for collecting the flows from the openings of the supplying paths of the heat exchange section 2. Two ducts 7 are provided in this example. The space 6 also contains ducts 8 for distributing the flow from the return duct 11 of the reaction section into the openings for the return paths of the heat exchange section 2. Two ducts 8 are also provided in this example. These two types of ducts are referred to as "collection duct" and "distribution duct" respectively. The collection ducts 7 and distribution ducts 8 are separated from each other by a part of the heat exchange section and walls 13 equipped as required. Furthermore, all of these ducts are made to be connected with the ducts in the reaction section via openings provided on a surface different from the one contacting the heat exchange section. Namely, the collection ducts 7 are made to be connected with the supplying duct 9 of the reaction section for housing reaction elements and heating elements (hereafter referred to as reaction elements, etc.) via connection ports 14, and the distribution ducts 8 are made to be connected with the return duct 11 of the reaction section for housing the reaction elements etc. via connection ports 15. One supplying duct 9 exists, and also one return duct 11 exists, in the reaction section, and they are placed adjacent to each other across a wall 10, and made to be connected with each other via space 12.

In FIG. 2, details of the structure are omitted, but 18 represents distribution ducts, which have the similar structure as the distribution ducts 8, for distributing the fluid from space 17, toward which the fluid inlet port 16 of the reaction device is open, and 21 represents ducts, which have the similar structure as the collection ducts 7, for collecting the fluid discharged from the openings of the outlet of the return paths of the heat exchange section 2. Furthermore, the space 20 is connected to the fluid outlet port 19 of the reaction device.

The structure described above allows a fluid intended for reaction to enter the reaction device from the fluid inlet port 16, flow through the space 17, distribution ducts 18, supplying paths of the heat exchange section 2, regions 4, collection ducts 7, connection ports 14, and the supply duct 9 of the reaction section, return in the space 12, further flow through the return duct 11 of the reaction section, connection ports 15, distribution ducts 8, regions 5, return paths of the heat exchange section 2, collection ducts 21, space 20, and fluid outlet port 19 in that order, and during this flowing process, the fluid is subjected to preheating by heat exchange function, further heating and chemical reactions by reaction elements, etc., and cooling by heat exchange function, and discharged out of the reaction device.

Reaction elements mean catalytic structures in a state of honeycomb, foam, pellet, and mesh, or reaction means for allowing desired chemical reactions of the components contained in a fluid to progress by using a burner or applying high voltage. Heating elements means various heating means for generating heat within ducts, such as electric resistance heating, microwave/electromagnetic induction heating, burners, combination of heating reaction components in a fluid and a catalyst for promoting the reaction, and thermal non-equilibrium plasmas for generating heat by applying high voltage.

Examples of combination of heating reaction components in a fluid and catalysts include the combination of $H_2$, CO, and dydrocarbons such as propane and solid catalysts containing active components such as Pt, Pd, Rh, Ni, Co, Cu, and Mn. General catalytic oxidation reactions can thus be used. In addition, the reaction elements can also be used as heating elements. If a desired reaction progresses and heat is generated as a result of decomposition or oxidation of one of the components in a fluid due to temperature increase, these reaction means or heating means need not be provided, and the duct space of the reaction section itself can be used as reaction elements, etc. Furthermore, in addition to these reaction elements, etc., other elements or functions may be added within the ducts 9 and 10. For example, ceramic pellets having large thermal capacity can be placed as a heat storage element. Or, porous adsorbent for adsorbing a desired component in a fluid may also be used.

If a fluid is heated by the heat of reaction or by a heating element placed within the duct of the reaction section, the temperature of the fluid flowing through regions 5 where the inlets of the return paths of the reaction section 2 exist becomes slightly higher than the temperature of the fluid flowing through regions 4 where the outlets of the supplying paths exist. Because of this temperature difference, heat transfers from the return path side to the supplying path side of the heat exchange section. As a result, the temperature of the fluid within the region 4 where the outlets of the supplying paths exist becomes higher than the temperature of the fluid at the time of entry into this reaction device. Namely, thanks to the structure of this reaction device, the fluid to be processed is preheated by heat exchange function prior to the inflow into the reaction elements within the ducts in the reaction section to increase its temperature significantly. The higher the heat recovery performance of the heat exchange section is, the higher the temperature becomes. For example, under completely thermally-insulated conditions, where no heat dissipation occurs through outer surface of the device or piping, and if heat recovery ratio is 80% or higher, this temperature increase is five times as high as the increase allowed by the heating within the ducts in the reaction section only. Since the higher the temperature, the faster the reactions in general, such significant temperature increase promotes the speed of desired reactions.

Furthermore, if a heat-accumulating element is placed within the ducts of the reaction section, fluctuation of the temperature of the fluid flowing into this reaction device can be minimized, even if the temperature fluctuates with time, and the higher the heat recovery performance, the higher the effect of decreasing the fluctuation. If the temperature of the reaction section could be maintained at a constant level in this way, desired reaction promotion effect by temperature increase could be maintained at all times, or the optimum temperature for a desired reaction could be obtained, and thus reaction selectivity can be improved. In addition, if an adsorbing material is placed upstream of the reaction elements and heat-generating elements within the ducts of the reaction section, a desired reaction can proceed more accurately. For example, when a volatile organic compound WOO contained in air is subjected to oxidative destruction with this reaction device equipped with an oxidation catalyst, the VOC is captured by adsorption in the initial stage where the temperature within the device is low and desired oxidative catalyst reaction does not proceed, and then the reaction elements placed downstream of the adsorbing material are heated using the heating elements, and thus the incoming air is heated by the heat exchange section to allow the VOC to be desorbed from the adsorbent, and the desorbed VOC can be subjected to oxidative destruction with the reaction element already heated thoroughly.

By adopting the structure of the present invention, the heat exchange section in a stacked structure having high heat recovery performance can be made to be connected with the reaction section via the collection and distribution ducts of a minimum volume. In addition, since these collection and distribution ducts are sandwiched by the heat exchange section and the reaction section, the entire device can be in a shape of a compact rectangular parallelepiped, and thus the degree of heat dissipation can be minimized, and high preheating performance, namely high temperature increase effect, which cannot be ensured by conventional devices, can be obtained by this compact device. Furthermore, since the duct in the reaction section can be placed at one position each in consecutive supplying and return paths, or integrated into a few positions, while allowing the direction of the flow of supplying and return paths in the heat exchange section to come close to a perfect counter flow, namely while ensuring high heat exchange performance, desired operations such as reaction, heating, and adsorption of the fluid can be performed by placing reaction elements, heating elements, or other heat-accumulating elements and adsorbing materials at one or a few positions on the paths. Consequently, compared with the case in which a number of ducts are provided within the reaction section depending on the number of regions having the inlets/outlets of the heat exchange section, the control of reaction is facilitated, and the structure within the ducts of the reaction section is simplified, which decreases the cost for manufacturing the reaction device. In this embodiment, two collection ducts and also two distribution ducts are provided. However, more ducts can be used, and the higher the number of ducts, the higher the heat recovery rate of the heat exchange section. Furthermore, the quantity of collection ducts and that of distribution ducts need not be the same. Collection ducts that outnumber distribution ducts by one, or vice versa, can be used. This configuration rather ensures better symmetry of the duct structure, and consequently, higher performance is expected.

Second Embodiment

Figure 5:
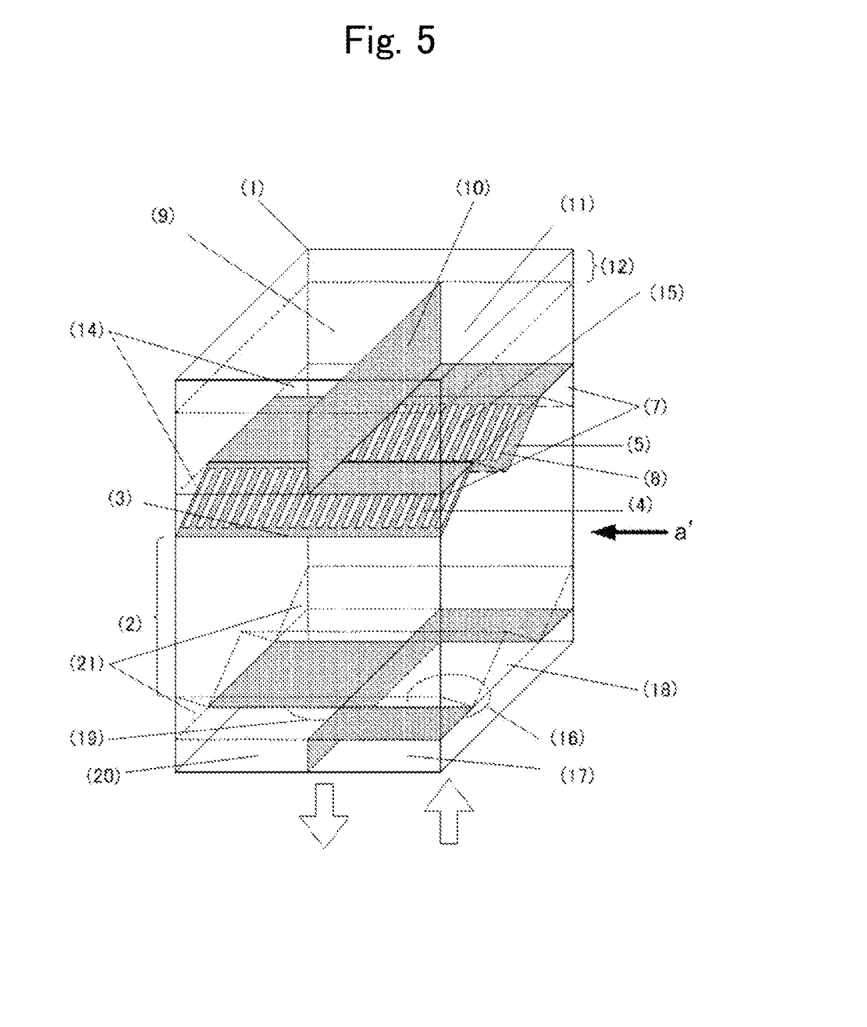
FIG. 5 is a cubic perspective view of another embodiment of the reaction device of the present invention, the side surface 3 being in a form of a plurality of valleys.
Figure 6:
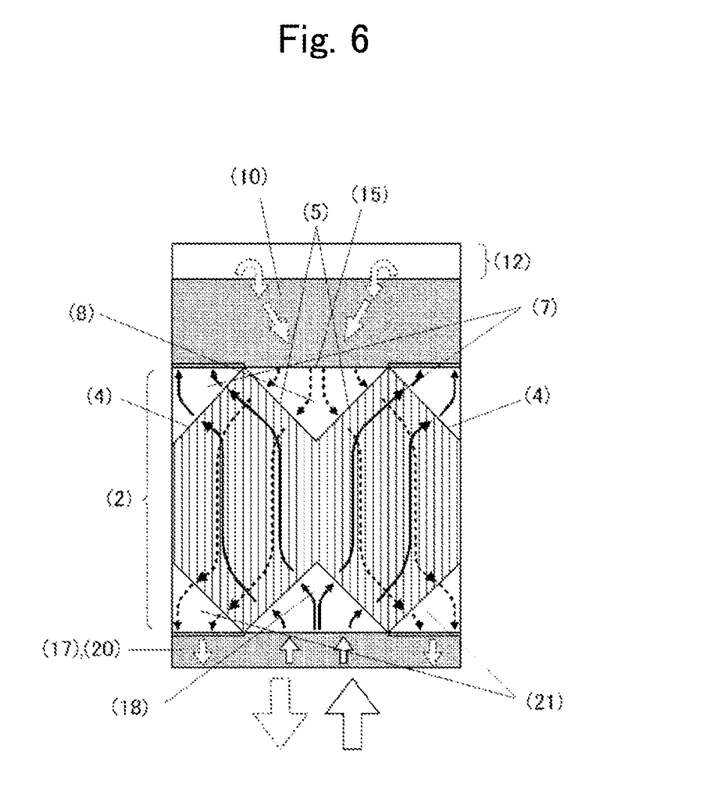
FIG. 6 is a perspective cross-sectional view of the reaction device shown in FIG. 5 viewed from direction a'.

In FIG. 2, the regions having the openings as the outlets of the supplying paths of the heat exchange section and the regions having the openings as inlets of the return paths exist on the same plane, but such regions need not exist on the same plane but may exist in a structure in which a plurality of valleys extend in the same direction. FIGS. 5 and 6 illustrate such an embodiment. FIG. 5 is a cubic perspective view of the entire structure, whereas FIG. 6 is a perspective cross-sectional view of the reaction device shown in FIG. 5 viewed from direction a'. In FIGS. 5 and 6, the same signs used in FIGS. 2 to 4 are used, and the reaction elements and heating elements are not shown.

In the reaction device shown in FIGS. 5 and 6, there exists a valley, at the central portion of the surface corresponding to the side surface 3 shown in FIG. 2, whose cross section is in a form of an isosceles right triangle, with the inclination being 45° and the angle of the bottom of the valley being 90°. On the inclined surfaces, a plurality of openings are arranged as the inlets of the return paths of the heat exchange section 2. On each of the right and left sides of the valley exists a valley also in a shape of an isosceles right triangle, one of which constituting the outer wall of the reaction device and the other having the inclination of 45°, and a plurality of openings are arranged on the inclined surface as the outlets of the supplying paths of the heat exchange section 2. Namely, two ridges, whose cross section is in a shape of isosceles right triangles (FIG. 6), are formed on the side surface 3, and by creating openings 14, 15 on a part of the plane including the top edge of the ridges, the region 4 where the outlets of the supplying paths of the heat exchange section exist is made to be connected with the supplying duct 9 of the reaction section, or the return duct 11 of the reaction section is made to be connected with the region 5 where the inlets of the return paths of the heat exchange section 2 exist. The positional relation between space 17 directly connected to the fluid inlet port 16 of the reaction device and another distribution duct 18 in respect of the flow is the same as the positional relation between the return duct 11 of the reaction section and the distribution ducts 8. The positional relation between the space 20 directly connected to the fluid outlet port 19 of the reaction device and another collection ducts 21 is the same as the positional direction between the supplying duct 9 of the reaction section and the collection ducts 7.

In the embodiment described above, the valleys on the surface of the heat exchange section form ducts for allowing the plurality of openings of the heat exchange section to be connected with the pair of supplying and return ducts of the reaction section and with the pair of inlet and outlet of the reaction device. Consequently, a cross-flow heat exchange structure can be formed within the half of the volume of the spaces 6 and 22 in FIG. 2, and higher heat exchange performance can thus be obtained with the same volume. In addition, since the region where inlets/outlets of the heat exchange section exist is inclined, geometric surface area is larger than that in FIG. 2, which allows the pressure loss of the flow in this region to be minimized.

In this embodiment, the cross section of the valley at the center is in a shape of an isosceles right triangle, but the angle of the bottom of the valley is not limited to 90°. Furthermore, the shape of the cross section of the valley is not limited to an isosceles right angle. Other triangles, or trapezoids, hemicircles, and arches can be adopted, on condition that the openings of the heat exchange section can be arranged in one direction. The case in which the number of valleys is three was described. However, the configuration having four or more valleys is adaptable. The higher the quantity of valleys, the higher the heat recovery rate of the heat exchange section, and thus the effect of the present invention will be exerted more efficiently.

Third Embodiment

Figure 7:
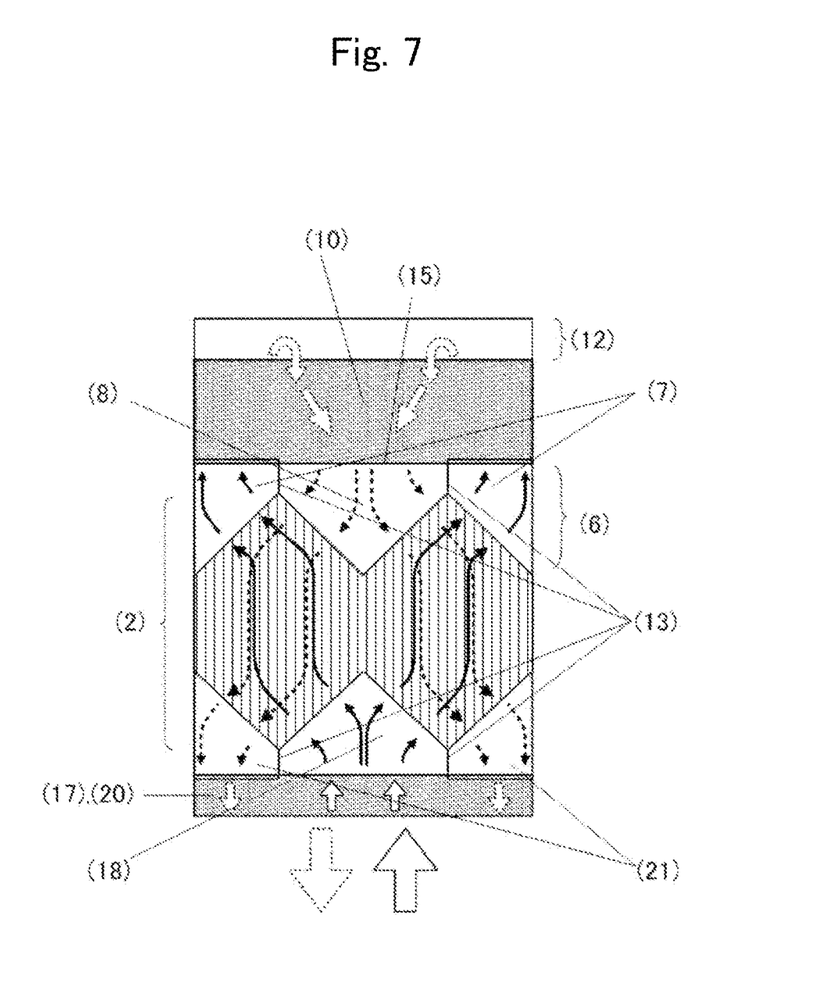
FIG. 7 illustrates yet another embodiment of the reaction device of the present invention, namely a perspective cross-sectional view viewed from the same direction as FIG. 6. A plurality of valleys are formed on the side surface 3, and the space provided between the heat exchange section and the supplying/return ducts of the reaction section is divided to provide collection and distribution ducts.

FIG. 7 is a perspective cross-sectional view of another embodiment where partition walls 13 similar to the one shown in FIG. 2 are provided to a device having valley-shaped surfaces on which openings are provided as inlets/outlets of the fluid as shown in FIG. 5, viewed from the same direction as in FIGS. 3 and 6.

This embodiment is, in a sense, a combination of the shape shown in FIG. 2 and that shown in FIG. 5. Specifically, the collection and distribution ducts are comprised of the valleys in the heat exchange section and the gaps formed between the ducts in the reaction section and the heat exchange section. By taking such a configuration, the cross-sectional area of the collection and distribution ducts can be adjusted by the height of the gaps without being affected by the shape of the valleys. The pressure loss of the flow in the ducts can thus be decreased to a desired level.

Fourth Embodiment

Figure 8:
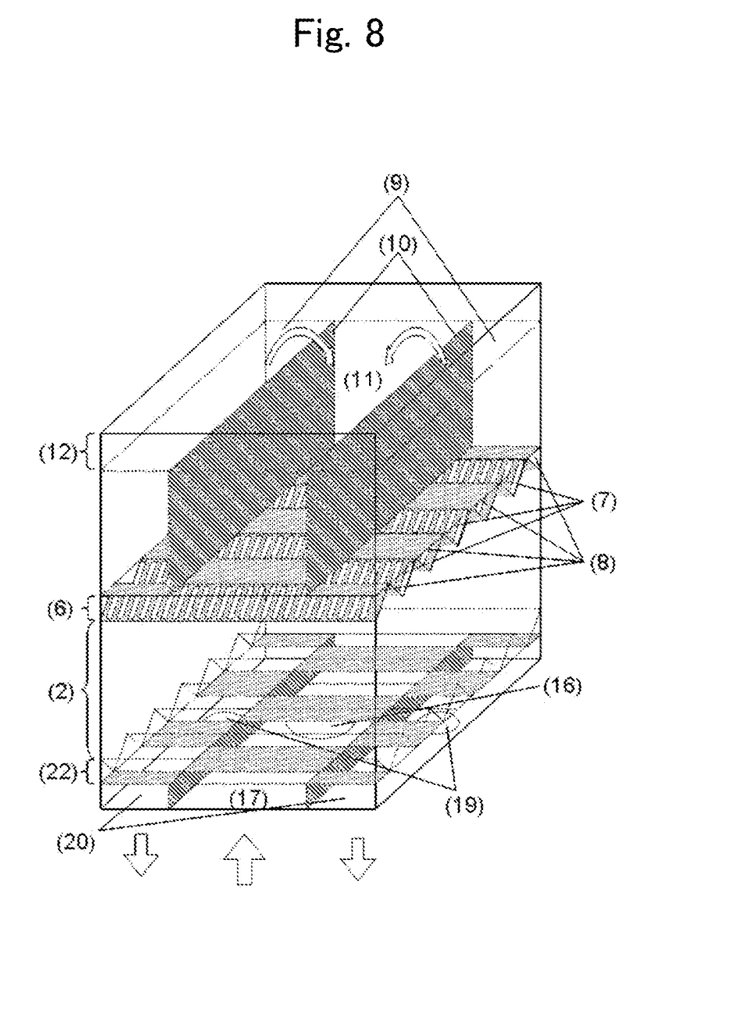
FIG. 8 is a cubic perspective view illustrating another example having a side surface 3 in a form of a plurality of valleys as in the case of FIG. 5, where the number of collection ducts of the supplying path is three, the number of distribution ducts of the return path is four, the number of supplying ducts of the reaction section is two, and the number of return duct is one.

FIG. 8 is a cubic perspective view illustrating another example of the present invention having collection ducts and distribution ducts, as in the case of the device shown in FIGS. 5 and 6. The same signs used in FIGS. 5 and 6 are used, and reaction elements and heating elements are not shown.

In this example, six corrugations whose cross section is in a form of an isosceles right triangle are formed on the side surface of the heat exchange section on the side of the duct of the reaction section, and in the valley-shaped gaps, three collection ducts 7 and four distribution ducts 8 are formed, in addition to two supplying ducts 9 and one return duct 11 of the reaction section. If a heat exchanger-integrated reaction device having a heat exchange section of a similar structure is manufactured based on the prior art (Patent Literature 6), three supplying ducts and four return ducts of the reaction section, seven ducts in total, are formed on the side of the ducts of the reaction section corresponding to the number of regions having fluid outlets/inlets of the heat exchange section. Since reaction elements of the same quantity must be installed, the structure of the device becomes quite complicated. Meanwhile, with this embodiment, since the total number of supplying ducts in the reaction section can be decreased to three, the arrangement of the reaction elements, etc. (not shown) can be simplified significantly. In particular, since there is only one return duct in the reaction section and the entire fluid passes there, auxiliary heating of the fluid can be conducted by placing only one heating element in this duct, which is very practical and convenient.

Example

Heat recovery performance test by catalytic combustion of low-concentration hydrogen)

Figure 9:
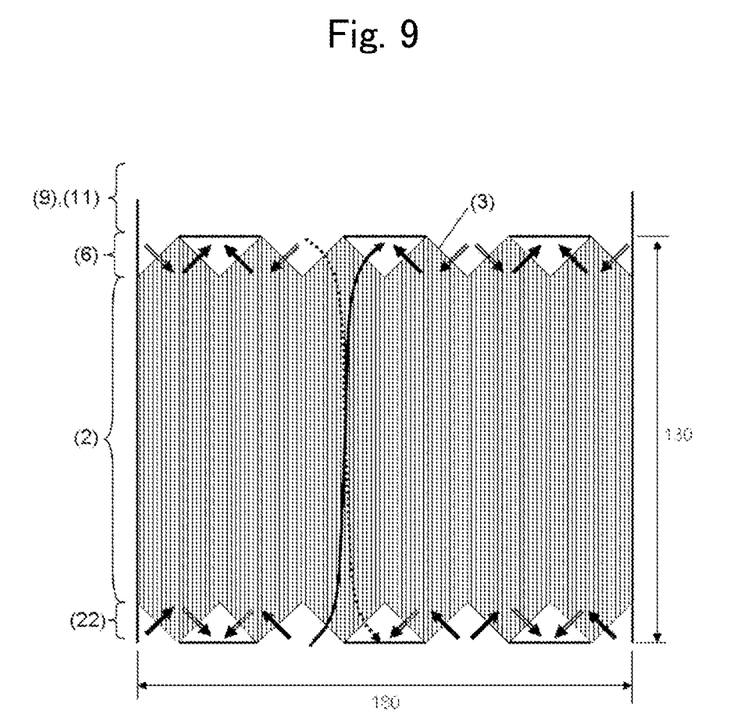
FIG. 9 is a cross-sectional view of the center region of the heat exchange section of the prototype reaction device of the present invention.

To confirm the effect of the present invention, a heat exchanger-integrated reaction device as shown in FIG. 8, whose side surface 3 is in the form of six ridges having cross section in the shape of an isosceles right triangle and which has two supplying ducts and one return duct, was created experimentally. FIG. 9 is a cross-sectional view of the central portion around the heat exchange section of the prototype reaction device. The heat exchange section measures approximately 180 mm in width, 130 mm in total length in the flow direction, 180 mm in the thickness in stacking direction, and 2.0 mm in the distance between each flow in the gap. As shown by the flow lines drawn in the figure, the supplying and return flows within the heat exchange section is made to be fairly close to a perfect counter flow thanks to the inlet/outlet region of the heat exchange section divided into many sections. Furthermore, a platinum catalyst-supporting cordierite honeycomb (cell density: 400 pc./sq.in., volume: 780 cm$^3$, weight of supported platinum: 5.9 g) was housed in the return duct of the reaction device, and by feeding air containing hydrogen in concentrations of 0 to 1% into the honeycomb at the rate of 499 L/min., catalytic combustion was realized. By measuring the temperature at the inlets/outlets of the heat exchange section at this time, heat recovery performance was assessed.

As a result of the experimental catalytic combustion of air containing hydrogen in concentration of 0.986%, the temperatures at the following positions were found to remain in steady state at the following temperatures: Temperature of incoming air from outside the heat exchange section $T_0=26°$ C., temperature at the outlets of the supplying paths of the heat exchange section $T_1=264°$ C., and the temperature at the inlets of the return paths of the heat exchange section $T_2=336°$ C. From the above, the heat recovery rate $\Phi$ of the heat exchange section of this reaction device was calculated to be 0.77 (77%) using the equation $\Phi=(T_1-T_0)/(T_2-T_0)$. This value can be converted into heating efficiency F of 4.3 using the equation $F=1/(1-\Phi)$, which means that temperature increase rate 4.3 times higher than that of conventional reaction device not provided with heat exchange function can be achieved using the same auxiliary heating energy. The structure of the present invention has thus been found to have high heat recovery performance, and thereby high temperature increase effect of the reaction section.

REFERENCE SIGN LIST

1: Heat exchanger-integrated reaction device having a pair of supplying and return ducts as a reaction section
2: Heat exchange section having stacking structure
3: One side surface of the heat exchange section
4: Region on the side surface 3 provided with outlets of the supplying paths of the heat exchange section
5: Region on the side surface 3 provided with inlets of the return paths of the heat exchange section
6: Space adjacent to the side surface 3
7: Collection duct for collecting the flows from the outlets of the supplying paths of the heat exchange section
8: Distribution duct for distributing the flows of the return paths from the return duct 11 of the reaction section
9: Supplying duct of the reaction section for housing reaction elements, etc.
10: Wall separating the supplying duct 9 of the reaction section and the return duct 11 of the reaction section
11: Return duct of the reaction section for housing reaction elements, etc.
12: Space for allowing the supplying duct 9 of the reaction section to be connected with the return duct 11 of the reaction section
13: Wall separating the collection ducts 7, 21 from the distribution ducts 8, 18 in space 6, 22
14: Connection port for collecting the flows in the collection ducts 7 into the supplying duct 9 of the reaction section
15: Connection port for distributing the flow in the return duct 11 of the reaction section into the distribution ducts 8
16: Fluid inlet port of the reaction device
17: Part of the space within the reaction device adjacent to the fluid inlet port 16
18: Distribution duct of the same structure as the distribution duct 8, for distributing incoming fluid into the inlets of the supplying paths of the heat exchange section
19: Fluid outlet port of the reaction device
20: Part of the space within the reaction device adjacent to the fluid outlet port 19
21: Collection duct of the same structure as the collection duct 7 for collecting the supplying fluid from the openings of the heat exchange section
22: Space for forming distribution ducts 18 and collection ducts 21
23: Reaction element
24: Heating element

What is claimed is:

1. A heat exchanger-intergrated reaction device, comprising:
the heat exchange section having an integrated stacking structure of a plurality of planar flow path layers divided by sheet partition walls, which serve as heat exchange surfaces,
the plurality of planar flow paths extending in one direction with two types of flow paths, namely a plurality of supplying and a plurality of return paths of the same fluid, alternately placed adjacent to each other,
regions having outlets of the supplying paths and inlets of the return paths being provided on one side surface of the heat exchange section located at one end of the extending direction,
the regions having the outlets of the plurality of supplying paths being provided with openings for discharging the fluid on the cross sections of every other stacked layers of the plurality of the planar flow paths, whereas the regions having the inlets of the plurality of return paths being provided with openings for receiving the fluid on the cross sections of every other stacked layers of the plurality of the planar flow paths not provided with the afore-mentioned openings,
the reaction section in which reaction elements and/or heating elements are placed comprising at least one supplying duct and at least one return duct, wherein the supplying ducts and the return ducts being made to be connected with each other with space provided facing opposite to the heat exchange section,
characterized in that
at least one of the regions where the outlets of the supplying paths exist, or where the inlets of the return paths exist, is provided at two or more positions,
space is provided between the heat exchange section and the reaction section, the space being divided into a plurality of collection ducts for collecting the flows of the fluid from the regions having the openings for discharging the fluid a smaller number of supplying ducts of the reaction section and a plurality of distribution ducts for distributing the flows of the fluid from the return duct of the reaction section into a larger number of regions having the openings for receiving the fluid, and that openings for allowing all the collection ducts to be connected with the supplying ducts of the reaction section are provided along with openings for allowing all the distribution ducts to be connected with the return ducts of the reaction section.

2. The heat exchanger-integrated reaction device as set forth in claim 1, characterized in that one side surface of the heat exchange section has a plurality of valleys extending in one direction, the plurality of valleys having either the openings of the supplying paths or the openings of the return paths only, and that each concave space serves as a duct for collecting each flow of the supplying and return paths or a distribution duct, or a part thereof.

* * * * *